United States Patent [19]

Franklin

[11] Patent Number: 4,723,835
[45] Date of Patent: Feb. 9, 1988

[54] HEATER CONTROL APPARATUS FOR LIQUID CRYSTAL DISPLAY WITH INTEGRAL HEATER

[75] Inventor: Gerald K. Franklin, Albuquerque, N. Mex.

[73] Assignee: Honeywell Inc., Minneapolis, Minn.

[21] Appl. No.: 843,455

[22] Filed: Mar. 24, 1986

[51] Int. Cl.[4] ............................ G02F 1/13; H05B 1/00
[52] U.S. Cl. ............................ 350/331 R; 350/331 T; 219/209; 219/210
[58] Field of Search ............... 350/331 R, 331 T, 332, 350/333; 219/209, 210, 501; 307/570, 254

[56] References Cited

U.S. PATENT DOCUMENTS

| | | | |
|---|---|---|---|
| 4,029,393 | 6/1977 | Dungan et al. | 350/331 R |
| 4,119,842 | 10/1978 | Hayden et al. | 350/331 T |
| 4,390,874 | 6/1983 | Woodside et al. | 350/331 T |
| 4,584,461 | 4/1986 | Teshima et al. | 219/209 |
| 4,593,977 | 6/1986 | Takamatsu et al. | 350/333 |

FOREIGN PATENT DOCUMENTS

| | | | |
|---|---|---|---|
| 656228 | 1/1963 | Canada | 307/254 |
| 1276251 | 8/1968 | Fed. Rep. of Germany | 219/210 |
| 0127519 | 10/1980 | Japan | 350/333 |

*Primary Examiner*—Stanley D. Miller
*Assistant Examiner*—Trong Quang Phan
*Attorney, Agent, or Firm*—Albin Medved; Seymour Levine

[57] ABSTRACT

A heater control circuit for the integral heater of a liquid crystal display comprising solid state switches that simultaneously connect and disconnect the high side and low side of the heater from power and ground, respectively, in response to display temperature. A blend resistor is connected between the heater and ground to bleed off accumulated charge that would erroneously drive one of the solid state switches into conduction.

9 Claims, 4 Drawing Figures

HEATER CONTROL APPARATUS FOR LIQUID CRYSTAL DISPLAY WITH INTEGRAL HEATER

The Government has rights in this invention pursuant to contract DAAK-50-83-C-0027 awarded by the Department of the Army.

BACKGROUND OF THE INVENTION

1. Field of the Invention

The invention relates to liquid crystal displays particularly with respect to controlling an integral heater thereof.

2. Description of the Prior Art

Liquid crystal displays (LCD) have found widespread usage in the prior art, one such display being, for example, of the twisted nematic liquid crystal type. Such LCDs operate by applying an alternating potential between the front and rear electrodes of the display. The RMS voltage of the applied potential determines if a display segment is on or off. The alternating potential must have an average DC level that is below the DC potential that causes electroplating between the front and rear electrodes. The electroplating process causes the LCD to fail due to destruction of the alignment coatings. It is appreciated, however, that significant electroplating does not occur at low temperatures but at high temperatures, electroplating can occur to cause dislay failure. At high temperatures the average DC voltage between the front and rear electrodes of the display must be maintained below the level that results in electroplating action. Present day integrated circuit power supplies for LCDs typically provide an alternating driving potential with such a low DC level that even at high temperatures the rate of electroplating is so minimal as to be undetectable.

Present day LCDs become inoperative at very low temperatures. At minus 10 to 20 degrees centigrade, the fluid in the LCD becomes so stiff that the LCD display elements do not turn on. Separate heaters have been provided with LCDs so that the device operates at low temperatures. Typically, one side of the heater is permanently connected to a DC potential and the other side of the heater is switchably connected to ground to activate and deactivate the heater in response to LCD temperature. The separate heater has a number of disadvantages. In order to heat the display fluid to a fixed temperature, the heater must be hotter than the desired display temperature. The difference in temperature between the display and the heater is proportional to the low temperature turn on time of the LCD. The hotter the heater, the faster the display will commence operation during a cold temperature startup. Since it is the fluid in the LCD and not the remainder of the unit that must be heated, most of the energy provided by the heater is wasted. Additionally, the time required to heat the fluid is proportional to the distance between the fluid and the heating element. The closer the heater is to the fluid, the faster the fluid can be heated. Thus, LCDs with separate heaters tend to exhibit sluggish cold temperature response.

Recently, commercially procurable LCDs have been manufactured with an integral heater element. This heater traditionally comprises a thin sheet of, for example, indium tin oxide (ITO) plated on the back of the rear glass plate of the display on the front of which are deposited the rear LCD electrodes. The heater element is typically sandwiched between the back surface of the rear glass plate and the rear polarizer of the device. By this arrangement the heat transfer characteristics are improved with respect to the separate heater configuration thereby providing fast cold temperature operation.

As previously described, traditional heater operation provides maintaining a DC voltage connected to the high side of the heater and switchably connecting the low side of the heater to ground. Alternatively, a ground connection can be permanently effected to the low side of the heater with the heater DC potential switchably applied to the high side. With this integral heater arrangement, a capacitor is formed with the front and rear LCD electrodes providing one capacitor electrode and the heater providing the other capacitor electrode with the rear glass that separates the front and rear LCD electrodes from the heater providing the capacitor dielectric. With an alternating potential applied between the front and rear LCD electrodes and the heater connected to a fixed potential, an average DC current flows between the heater and the LCD electrodes because of the current path established between the LCD electrodes and heater power or ground resulting from the fixed potential connection to the heater. At high temperatures this DC current flow results in sufficient electroplating action so as to damage the alignment coatings resulting in display failure. Because the failure mode is caused by electroplating, at low temperatures, even with the heater activated, the rate of electroplating is undetectible and it is appreciated that the heater is only activated at low temperatures. Thus, at high temperatures, the DC current flowing, even with the heater deactivated, is sufficient to result in a rapid degradation of the alignment coatings which causes premature LCD failure. The rate at which the electroplating occurs that results in failure is proportional to the temperature of the crystal and the average difference in DC potential between the heater and the front and rear LCD electrodes. The higher the DC potential and the higher the temperature, the greater is the rate of electroplating and hence the greater is the rate of display failure.

The phenomenon that results in failure can also be appreciated by considering that the rear LCD electrodes form a capacitor with the heater, the front LCD electrodes form a capacitor with the heater, and the front and rear LCD electrodes form a capacitor with respect to each other with the LCD fluid acting as the dielectric therebetween. The current path provided by the fixed potential connected to the heater is principly through the rear LCD electrodes and therefore the alternating currents across the rear electrode capacitor and the front electrode capacitor flowing through the fixed potential connection are different. This creates an imbalance with respect to the capacitance between the front and the rear LCD electrodes resulting in a net DC current flow.

SUMMARY OF THE INVENTION

The above disadvantages of the prior art are obviated by utilizing means for disconnecting both the high side and low side of the heater from any potential when the heater is off. Preferably, semi-conductor switches are utilized to connect and disconnect both sides of the heater with respect to the heater power supply and return, which switches provide a high impedance when open. A high impedance path from the heater to ground is provided to bleed off any accumulated charge that may erroneously activate the semiconductor switches.

Thus, when the heater is deactivated, both the high and low sides thereof are disconnected from the remainder of the display circuitry. Both power and ground are switched into the heater when the heater is activated.

DESCRIPTION OF THE PREFERRED EMBODIMENT

Figure 1:
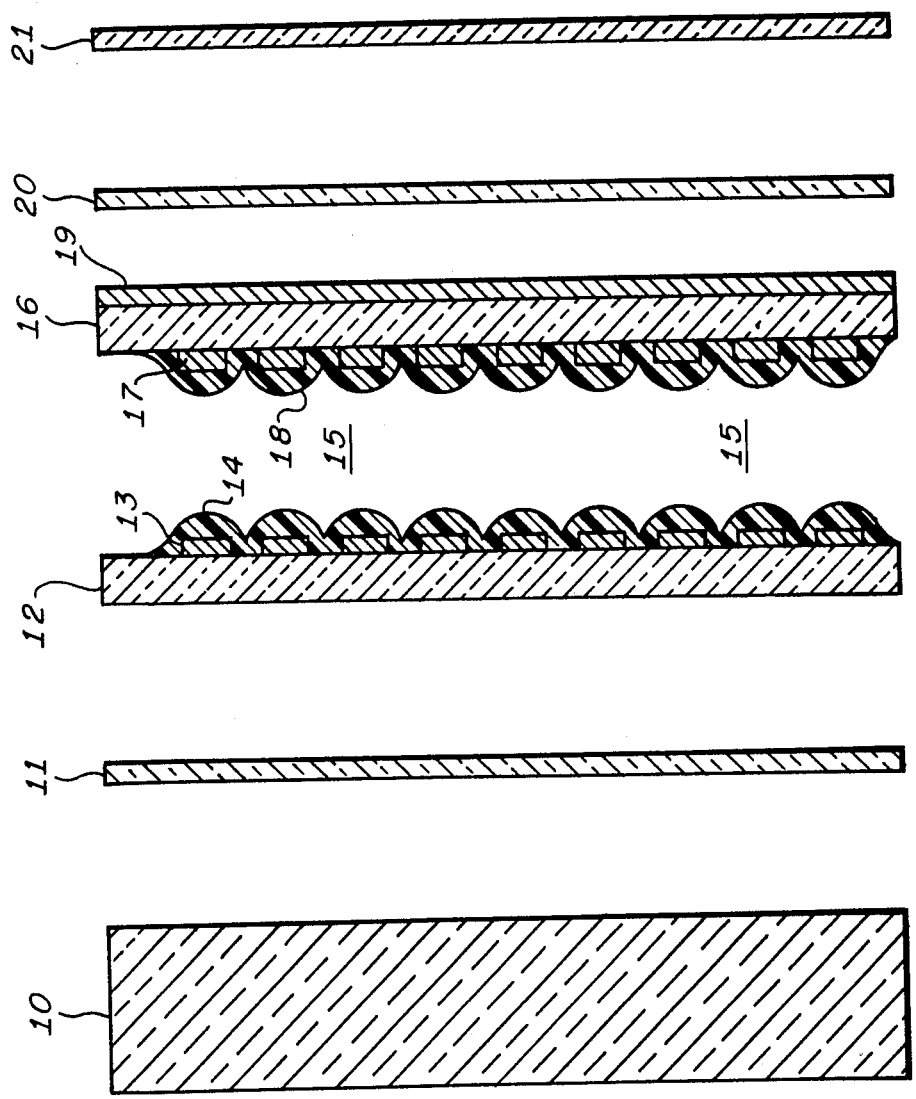
FIG. 1 is an exploded view illustrating the elements of a conventional liquid crystal display.

In order to appreciate the problem that engendered the heater control circuitry of the present invention, a description of an LCD with an integral heater and the electroplating failure mode obviated by the invention is provided. Referring to FIG. 1, the components that comprise an LCD and the relationships therebetween are illustrated. The LCD includes a front protective glass plate 10 that provides rigidity and protection for the LCD. Adjacent the plate 10 is a front polarizer that polarizes incoming light entering the device through the front plate 10. Following the polarizer 11 is a front glass plate 12 with metal electrodes 13 plated on the back surface thereof. Preferably, the front electrodes 13 are comprised of indium tin oxide (ITO) photoetched to the pattern of the LCD. It is appreciated that ITO is a clear conductive metal. Covering the electrodes 13 is a front alignment coating 14 that causes the liquid crystal fluid to become oriented in a specific direction. The alignment coating 14 traditionally is an organic compound that has been rubbed unidirectionally at an angle of 45 degrees with respect to the direction of polarization of the front polarizer 11. The coating 14 is often referred to as a "rub coating". Following the front elements 12-14 is a cavity containing the LCD fluid 15 which is comprised of long cigar shaped molecules, for example, nematic molecules. The alignment of the molecules of the fluid 15 adjacent the alignment coating 14 are influened by the direction in which the coating 14 is rubbed in a manner to be further described.

The rear side of the cavity in which the fluid 15 is contained, is defined by a rear glass plate 16 with ITO electrodes 17 plated thereon covered by an alignment coating 18. The elements 16–18 are similar to the elements 12–14, respectively, with the electrodes 17 forming a mirror image of the electrodes 13 and with the alignment coating 18 rubbed at an angle 90 degrees with respect to that of the alignment coating 14. The 90 degree offset of the alignment coating 18 with respect to the alignment coating 14 causes the molecules of the liquid crystal fluid 15 to rotate or twist by 90 degrees in orientation from the front alignment coating 14 to the rear alignment coating 18. A heater element 19 is plated on the rear surface of the glass plate 16 and is preferably a sheet of ITO.

Following the rear glass plate 16 and the heater 19 is a rear polarizer 20 having a direction of polarization oriented at 90 degrees with respect to the front polarizer 11. The display is completed by a reflector 21 that reflects light impinging thereon from the front of the display back through the LCD.

Figure 2:
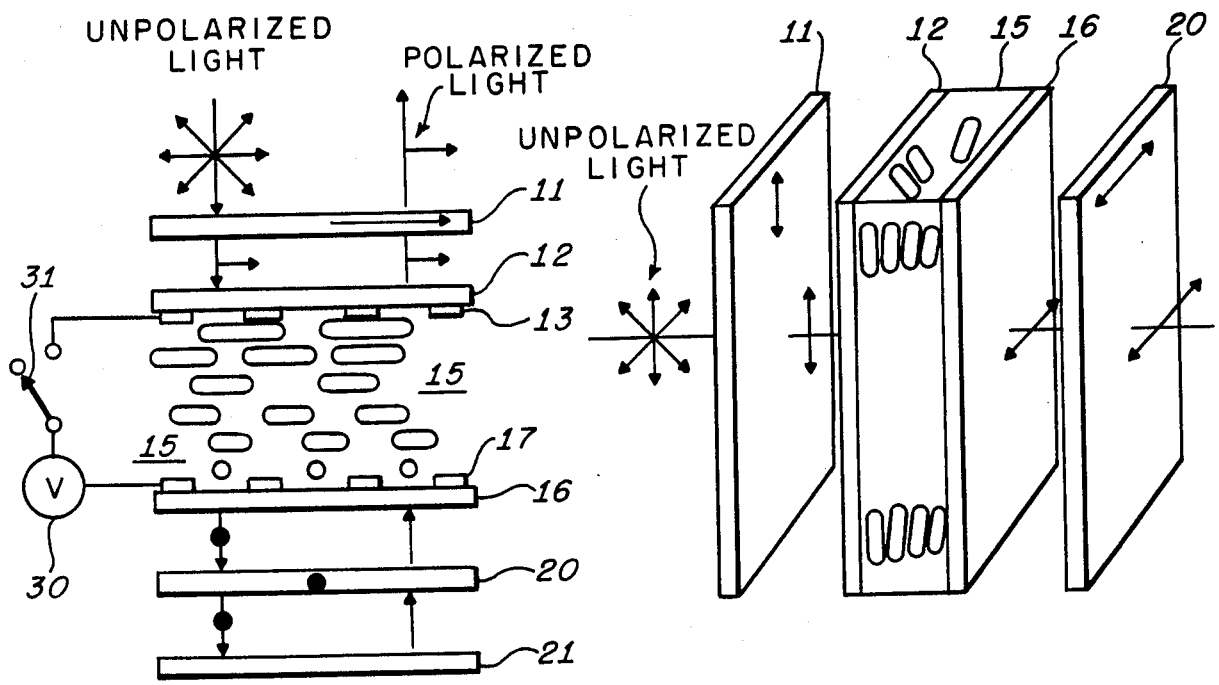
FIG. 2 is an exploded view and an isometric exploded view of a conventional liquid crystal display without alternating potential applied.
Figure 3:
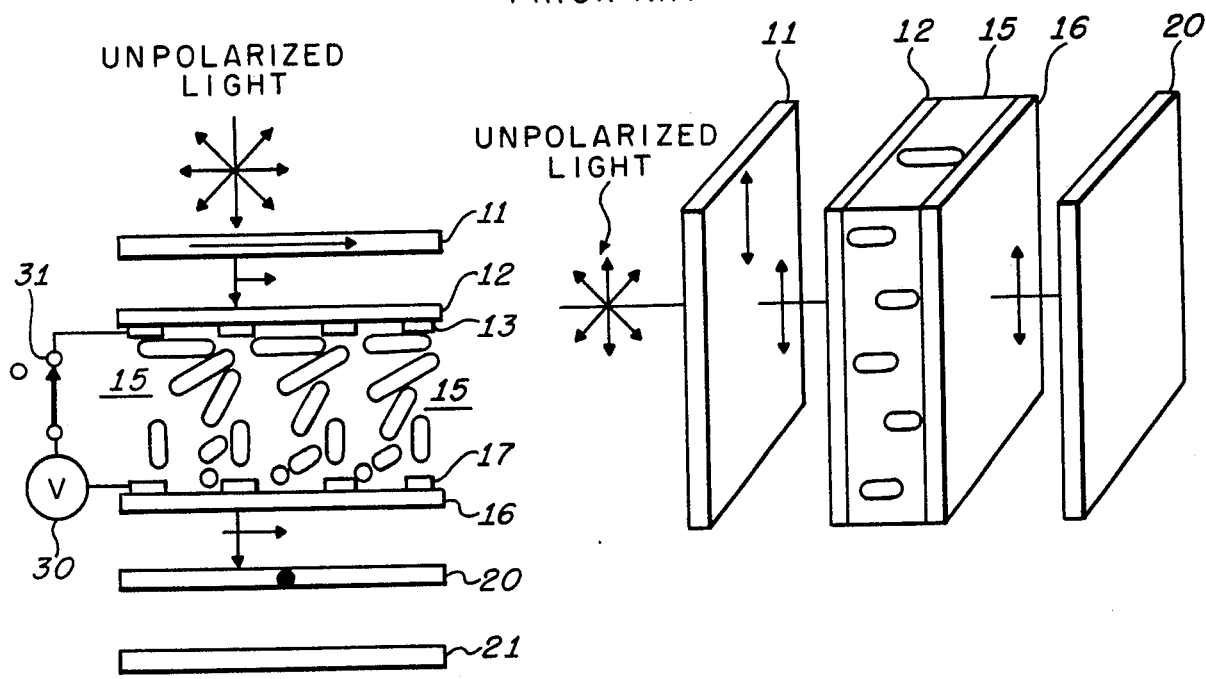
FIG. 3 is an exploded view and an isometric exploded view of a conventional liquid crystal display with alternating potential applied.

Referring to FIGS. 2 and 3, in which like reference numerals indicate like components with respect to FIG. 1, FIG. 2 illustrates the orientation of the nematic molecules of liquid crystal fluid 15 when no alternating potential is applied between the front and rear LCD electrodes and FIG. 3 illustrates the orientation of the nematic molecules of liquid crystal fluid 15 when an alternating potential is applied between the front and rear LCD electrodes. FIGS. 2 and 3 illustrate a source of AC potential 30 connected between the front electrodes 13 and rear electrodes 17 through a switch 31. In FIG. 2, the switch 31 is illustrated as open and the 90 degree twist in the nematic molecules of the LCD liquid crystal fluid 15 caused by the alignment coatings is illustrated. In FIG. 3, the switch 31 is illustrated as closed causing an orientation perpendicular to the electrodes 13 and 17 in the nematic molecules of the liquid crystal fluid 15 where the front electrodes 13 overlap the rear electrodes 17.

With continued reference to FIGS. 1 and 2, the LCD functions as follows with no alternating potential applied between the front and rear electrodes 13 and 17. Incoming unpolarized light is polarized by the front polarizer 11 so as to have only one orientation. As the light passes through the fluid 15, the orientation of the light is rotated by 90 degrees because of the 90 degree twist in the rotation of the molecules of the fluid. The light then impinging on the rear polarizer 20 passes therethrough because the rear polarizer 20 is oriented 90 degrees with respect to the front polarizer 11 and the light is also rotated 90 degrees. The light transmitted through the rear polarizer 20 impinges on the reflector 21 and is reflected back through the structure from back to front in the same manner as it propagated from front to back. Thus, with no AC potential applied across the electrodes 13 and 17, the viewer sees the white background of the reflector 21. FIG. 2, therefore, illustrates the quiescent state of the LCD.

Referring to FIGS. 1 and 3 the operation of the LCD with an AC potential applied between the front and rear electrodes 13 and 17 is illustrated. Unpolarized light passing through the front polarizer 11 is polarized so that it has only one direction. Now, however, because of the voltage applied by the source 30, the molecules of the fluid 15 are oriented perpendicular to the electrodes and light passes therethrough uneffected. When this unrotated light impinges upon the rear polarizer 20, it is 90 degrees out of phase therewith. Thus, this light is absorbed by the rear polarizer 20 and is not reflected back through the LCD. The overall effect is that in every area of the display where the front electrodes 13 overlap the rear electrodes 17, the LCD appears black when the voltage source 30 is applied. The LCD therefore provides a display with black characters on a white background. FIG. 3, therefore, illustrates the activated state of the LCD.

It is appreciated that in a practical display, an AC voltage is continuously applied between the front and the rear electrodes 13 and 17. When a segment is off, the root-mean-square (RMS) value of the potential is maintained sufficiently low to ensure that the fluid 15 does not respond to the voltage. When a segment is to be turned on, the RMS voltage is increased to the level where the molecules of the fluid 15 reorient themselves to be perpendicular to the front and rear LCD electrodes.

As discussed above, it is important in LCDs that the net DC component between the front and rear electrodes be maintained as close to zero as possible so as to prevent the LCD from failing. If the DC component is excessive, an electroplating process occurs where portions of an electrode are removed and electroplated on the opposite electrode. The electroplating itself does not cause the failure. LCD failure results when the electrode material migrates across the liquid crystal fluid 15 and punches a hole through both of the alignment coatings. This causes the fluid to lose alignment in the area of the damaged alignment coating and consequently the light is not twisted 90 degrees at this location and is therefore absorbed by the rear polarizer 20. This effect results in an LCD that appears to have segments turned on without any AC voltage applied thereto. As discussed above, even though present day LCD power supplies provide a sufficiently low DC component across the front and rear LCD electrodes, the use of the integral heater 19 with conventional heater power supplies results in LCD failure caused by a DC current path established between the LCD electrodes and the integral heater.

Figure 4:
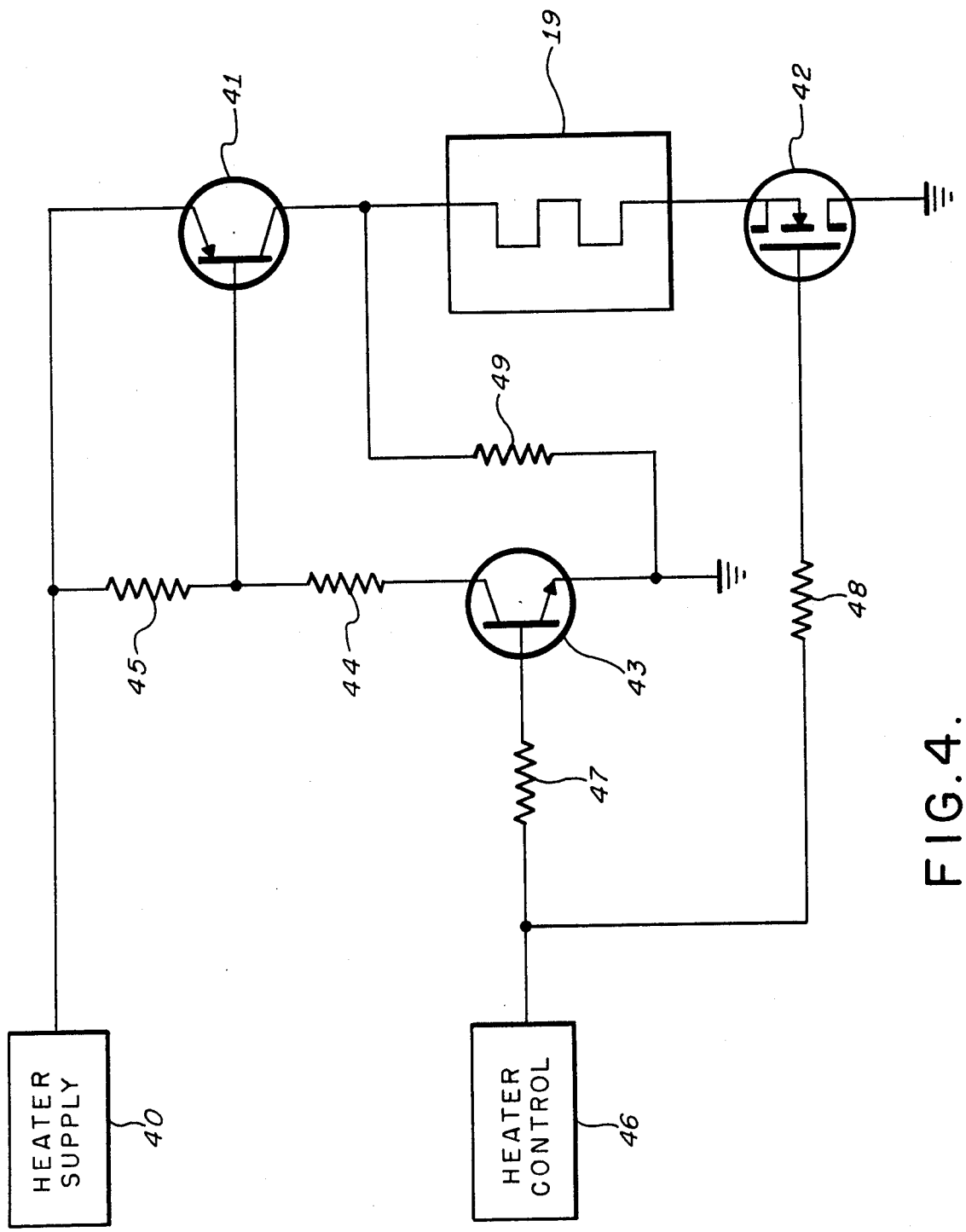
FIG. 4 is a schematic wiring diagram of a liquid crystal display heater control circuit implemented in accordance with the invention.

Referring to FIG. 4, in which like reference numerals indicate like components with respect to FIG. 1, a schematic wiring diagram of a heater supply that solves the failure problem of an LCD with an integral heater is illustrated. A heater voltage supply 40, for example, a +28 volt DC supply, provides power to the high side of the LCD heater 19 through a transistor switch 41. The transistor switch 41 is preferably implemented by a bipolar transistor, for example, a PNP type such as a 2N3792. The low side of the heater 19 is connected to ground through a transistor switch 42 which is preferably implemented by a power MOSFET, for example, a 2N6756. The heater supply 40 is connected to the emitter of the transistor 41 and the collector thereof is connected to the high side of the heater 19. The low side of the heater 19 is connected to the source electrode of the transistor 42 and the drain electrode thereof is connected to ground. A transistor switch 43 is included to control the state of the switch 41. The transistor switch 43 may, for example, comprise a bipolar transistor of the 2N3700 type. The collector of the transistor switch 43 is connected to the base of the transistor switch 41 through a resistor 44 and the emitter of the transistor switch 43 is connected to ground. A resistor 45 connects the base of the transistor switch 41 to the emitter thereof. A heater control 46 provides a heater control signal to the base of the transistor switch 43 and to the gate of the transistor switch 42 via current limiting resistors 47 and 48, respectively. A high impedance, static charge bleed path is provided from the heater 19 to ground through a resistor 49.

In operation, the heater control 46 senses the LCD temperature and determines when the heater 19 should be turned on. When the heater control 46 determines that the heater 19 should be off, it provides a low signal and when it determines that the heater 19 should be on, it provides a high signal. When the heater 19 should be off, the low heater control signal applied to the gate of the transistor switch 42 turns the switch off, isolating the low side of the heater 19 from ground by a very high impedance. Additionally, the low signal on the base of the transistor switch 43 turns the transistor switch 43 off, cutting off current flow through the resistor 44. This permits the resistor 45 to pull up the base of the transistor switch 41 causing the transistor switch 41 to be turned off. Thus the high side of the heater is isolated from the heater power supply 40 by a very high impedance. Therefore, at high temperatures the heater 19 is isolated from both power and ground. The resistor 49, which is selected to be approximately 10 megohms, provides a high impedance bleed off path for the heater 19. Without this path, because of the source-drain capacitance of the transistor switch 42 and the collector-emitter capacitance of the transistor switch 41, the voltage on the heater 19 slowly increases as a result of static charge buildup on the heater until the collector-base junction of the transistor 41 is forward biased. Current then flows from the heater 19 through this low impedance junction into the heater supply 40. This deleterious static charge is drained to ground through the resistor 49.

When the heater control 46 determines that the temperature of the LCD is too low, the heater control signal provided thereby switches from low to high. The high input on the gate of the transistor switch 42 turns the switch on shorting the low side of the heater 19 to ground. The high input on the base of the transistor switch 43 drives the transistor switch 43 into saturation shorting the low end of the resistor 44 to ground. The high end of the resistor 44 pulls down the base of the transistor switch 41 until the transistor switch 41 is in saturation. This shorts the high side of the heater 19 to the heater supply 40 turning the heater on.

It is therefore appreciated that the heater control circuit of FIG. 4 disconnects both the high side and the low side of the heater 19 from the remainder of the circuitry when the heater 19 is off and reconnects both sides of the heater 19 to power and ground when the heater 19 is turned on.

A field effect transistor (FET) is preferable to a bipolar transistor for switching the low side of the heater 19 to ground because of the higher impedance of the FET compared to that of the bipolar transistor when in the off state and the ease of controlling an FET. In connecting the high side of the heater 19 to the heater supply 40, it is preferably to utilize a PNP bipolar transistor. Because of the high impedance required, it is desirable to connect the high side of the heater 19 to the collector of the PNP bipolar transistor. An FET switch would not be suitable for the switch 41 because the control voltage to a FET is applied between the gate and source thereof. This would require a biasing resistor to set the gate to source voltage when the heater 19 is off defeating the purpose of the circuit. By, however, utilizing a PNP transistor, the biasing requirement is solved because the turn-on and turn-off voltage is determined by the voltage between the emitter and base of the transistor. This voltage is predetermined and is independent of the voltage on the collector of the transistor.

The resistor 45 pulls the base of the transistor switch 41 up in voltage toward the voltage of the emitter of the transistor switch 41 ensuring that the transistor switch 41 is off when the transistor switch 43 is off. In the preferred embodiment of the invention, the value of the resistor 45 is selected around 10K ohms so that little current is wasted when the transistor switch 43 is on. The resistor 44 limits the current that flows through the transistor switch 43 when the switch is on. The value of the resistor 44 is selected such that enough current flows through the base of the transistor switch 41 to drive the transistor switch 41 into saturation, but limits the current sufficiently that the transistor switch 43 does not fail because of excessive current flow. The bipolar transistor 43 is utilized as a switch permitting the resistor 44 to float when the transistor switch 43 is off and shorts the resistor 44 to ground when the transistor switch 43 is on.

The transistor switch 43 is selected to handle the necessary base current of the transistor switch 41 to drive the transistor switch 41 into saturation when the transistor switch 43 is on. The values of the resistors 47 and 48 are selected to suitably limit the amount of current flowing into the transistor switches 43 and 42, respectively. The transistor switches 41 and 42 are selected to handle the heater current and to have the highest impedance possible in the off state. The resistor 49 is utilized to slowly bleed off static charge on the heater 19. In the absence of the resistor 49, the a.c. potential of the LCD gradually increases the voltage across the transistor switch 42 until the voltage on the collector of the transistor switch 41 is sufficient to forward bias the collector-to-emitter diode of the transistor switch 41 causing conduction through this path. Instead of the heater 19 being isolated from the heater supply 40 by approximately 10 megohms, the isolation would diminish to approximately 50K ohms without the resistor 49. The largest value for the resistor 49 that maintains the transistor switch 41 turned off should be selected. A suitable value is approximately 10 megohms.

It is appreciated that the components selected to implement the preferred embodiment of FIG. 4 are exemplary, other components being utilizable to the same effect. Although not as desirable as the reliable solid state circuitry described, relay switches could be utilized in place of the transistor switches 41 and 42. It is appreciated that relay switches have the disadvantages of increased electromagnetic interference and increased size and weight. Additionally, because of the current flow required through the relay contacts when the heater 19 is on, it is expected that a relay would not provide a reliably practical embodiment of the invention.

Thus, the heater control circuit of FIG. 4 permits the heater to function appropriately when necessary at cold temperatures while permitting the LCD to function without degradation at high temperatures when the heater is off. This is accomplished by providing a low impedance path between the high and low side of the heater and the power and ground, respectively, when the heater is on and an extremely high impedance path between the high and low side of the heater and power and ground, respectively, when the heater is off. The circuit of the invention disconnects both the high and low side of the heater from any fixed potential when the heater is off and reconnects both sides of the heater when the heater is on. Utilizing the invention, as embodied in the circuit of FIG. 4, limits the current flow between the LCD and the heater to less than 250 nA when the LCD is at a high temperature, approximately 55° C., which results in preventing the LCD from prematurely failing at the high temperature.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. Heater control apparatus for use with a liquid crystal display having a heater integral therewith, said heater having an electrical input and an electrical output, current flowing between said electrical input and said electrical output resulting in heating of said heater, comprising:
    a source of electrical potential for providing said current to said electrical input,
    return means for providing a return path for said current from said electrical output,
    first switch means for switchably coupling said source of electrical potential to said electrical input,
    second switch means for switchably coupling said return means to said electrical output,
    actuating means coupled to said first and second switch means for simultaneously actuating said first and second switch means for coupling said source of electrical potential to said electrical input and said return means to said electrical output when said heater is to be actuated and for simultaneously deactuating said first and second switch means for decoupling said source of electrical potential from said electrical input and decoupling said return means from said electrical output, and
    bleed path means coupled between said heater and said return means for bleeding accumulated charge from said heater to said return means.

2. The apparatus of claim 1 in which said return means comprises electrical ground.

3. The apparatus of claim 2 in which said bleed path means comprises resistor means connected between said electrical input and said ground.

4. The apparatus of claim 1 in which said first switching means comprises a bipolar transistor coupling said source of electrical potential to said electrical input.

5. The apparatus of claim 4 in which said bipolar transistor comprises a PNP transistor with an emitter connected to said source of electrical potential, a collector connected to said electrical input and a base responsive to said actuating means.

6. The apparatus of claim 4 in which said second switching means comprises a field effect transistor coupled between said electrical output and said ground.

7. The apparatus of claim 6 in which said field effect transistor comprises a MOSFET with a source connected to said electrical output, a drain connected to said ground and a gate responsive to said actuating means.

8. The apparatus of claim 6 in which said return means comprises electrical ground and said apparatus further includes bleed resistor means coupled between said heater and said ground for bleeding accumulated charge from said heater to said ground, said resistor having the largest resistance value that maintains said bipolar transistor in a non-conducting state when said actuating means is deactuating said first switching means.

9. The apparatus of claim 1 in which said actuating means comprises a heater control for simultaneously actuating and deactuating said first and second switch means in response to the temperature of said liquid crystal display.

* * * * *